March 18, 1941.　　　　　H. J. REITER　　　　　2,235,167
SNAP FASTENER
Filed Feb. 7, 1940

INVENTOR
HAROLD J. REITER
ATTORNEY

Patented Mar. 18, 1941

2,235,167

UNITED STATES PATENT OFFICE 2,235,167

SNAP FASTENER

Harold J. Reiter, Chicago, Ill.

Application February 7, 1940, Serial No. 317,651

4 Claims. (Cl. 24—216)

The invention relates to improvements in snap fasteners and more particularly to an attaching member of the type having piercing tangs arranged to be passed through the material, to which the fastener element is to be attached, and engaged in a circumferential groove on an associated part.

An object of the invention is to provide a snap fastener element with an attaching member embodying reinforced means to insure a firm anchorage to an associated part.

Another object is to provide an attaching member with reinforced tangs to facilitate their piercing the material on which the fastener is mounted, without becoming distorted.

Another object is to provide a snap fastener element with means to render it less likely to become separated from its mounting or otherwise damaged while in use.

The foregoing and such other objects of the invention as will more fully appear hereinafter as the description proceeds will be more readily understood from a perusal of the following specification in which reference is had to the accompanying drawing, wherein.

Figure 1:
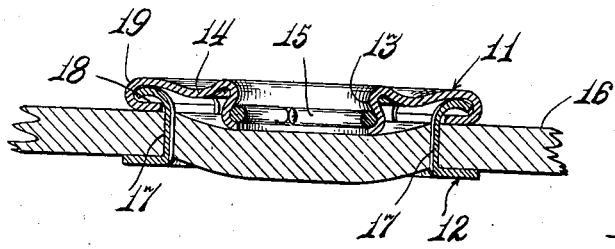
Fig. 1 is an enlarged central sectional view of a snap fastener element.
Figure 2:
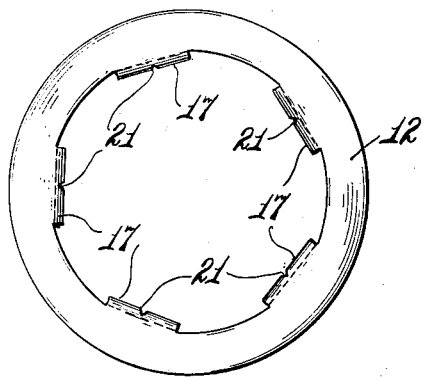
Fig. 2 is a plane view of the attaching member.

Referring to the structure illustrated the snap fastener element there shown consists of a female part 11 and an attaching member or part 12. As best shown in Fig. 1, the part 11 is formed integral preferably from a thin circular sheet of metal. A substantially cylindrical socket 13 is formed by striking or drawing the metal of the body 14 downwardly. Said socket preferably is enlarged at its lower end to provide an annular recess to receive a split ring 15 having a diameter slightly less than the diameter of a male part (not shown) to afford detachable interlocking engagement of the two parts.

In assembly, the female part 11 is positioned on one face of the sheet of material 16 to which it is to be attached and the attaching member 12 is positioned on the opposite face with its triangular piercing tangs 17 disposed toward the material. Pressure then is applied (preferably by a power press) to force the tangs 17 through the material and into contact with the bottom face of the body 14. Continued pressure causes the ends of the tangs to curl outwardly radially until they engage in an internal circumferential groove or channel 18 formed on the bottom face of the female part 11 by an annular bead 19. This engagement securely locks the two parts together on the material.

Figure 3:
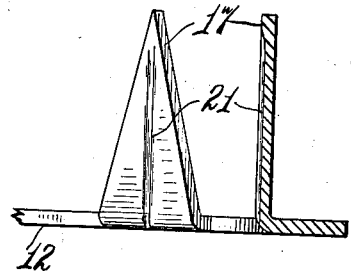
Fig. 3 is an enlarged fragmentary central sectional view of the attaching member.

To prevent unwarranted distortion of the tangs 17 while pressing them through the material, particularly when material such as leather or the like is used, each of said tangs preferably is provided with a longitudinal groove or channel 21, which, as best shown in Fig. 3, extend from the bases of the tangs substantially to their apexes. This groove materially strengthens the tang, due primarily to the displacement of the metal in the forming of the groove. When the tangs have passed through the material and are curled outwardly into the annular channel 18 of the female part 11, said tangs resist any tendency to straighten or pull out at any time while in use.

Obviously, fastener parts constructed differently from the one shown by way of illustration may be securely attached by an associated attaching member of the character constituting the essence of this invention, provided, of course, that suitable means is provided to receive the tangs 17.

I claim:

1. An attaching member for a snap fastener element comprising, a flat annulus, a plurality of flat triangular shaped piercing tangs disposed at right angles to said annulus, said tangs being integral with the inner circumferential edge of said annulus, and a groove on the inwardly disposed face of each of said tangs, said grooves being substantially V-shaped in section and extending substantially from the apex of said tangs to their bases without distorting the flat outwardly disposed faces of said tangs.

2. An attaching member for a snap fastener element comprising a flat annulus, a plurality of flat triangular shaped piercing tangs extending at right angles to said annulus, said tangs being integral with the inner circumferential edge of said annulus, and a shallow groove on the inwardly disposed face of each of said tangs, said grooves extending substantially from the apex of said tangs to their bases without distorting the flat outwardly disposed faces of said tangs.

3. An attaching member for a snap fastener element comprising a circular sheet of material, a plurality of flat triangular shaped piercing tangs disposed at right angles to the plane of said sheet, said tangs being spaced inwardly of the circumferential edge of said sheet, and a groove on the inwardly disposed face of each of said tangs, said grooves being substantially V-shaped in section and extending substantially from the apex of said tangs to their bases without distorting the flat outwardly disposed faces of said tangs.

4. An attaching member for a snap fastener element comprising a circular sheet of material, a plurality of flat triangular shaped piercing tangs integral with and extending at right angles to the plane of said sheet, and a groove on the inwardly disposed face of each of said tangs, said grooves being substantially V-shaped in section and extending substantially from the apex of said tangs to their bases without distorting the flat outwardly disposed faces of said tangs.

HAROLD J. REITER.